United States Patent
Kuwahara et al.

(10) Patent No.: US 7,013,147 B1
(45) Date of Patent: Mar. 14, 2006

(54) WIRELESS POSITIONING MEANS, WIRELESS POSITIONING APPARATUS AND MOBILE POSITION CONTROL CENTER APPARATUS

(75) Inventors: Mikio Kuwahara, Kokubunji (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 898 days.

(21) Appl. No.: 09/616,314

(22) Filed: Jul. 17, 2000

(30) Foreign Application Priority Data

Dec. 10, 1999 (JP) .................................. 11-351115

(51) Int. Cl.
*H04Q 7/20* (2006.01)
(52) U.S. Cl. ...................... 455/456.1; 455/296; 455/63
(58) Field of Classification Search ................ 455/456, 455/500, 501, 515, 570, 63, 67.1, 67.3, 67.6, 455/68, 456.1–456.6, 457, 296
See application file for complete search history.

(56) References Cited

U.S. PATENT DOCUMENTS

| | | | | |
|---|---|---|---|---|
| 5,235,612 A | * | 8/1993 | Stilwell et al. | 375/144 |
| 5,463,660 A | * | 10/1995 | Fukasawa et al. | 370/342 |
| 5,872,540 A | * | 2/1999 | Casabona et al. | 342/362 |
| 5,872,776 A | * | 2/1999 | Yang | 370/342 |
| 6,137,788 A | | 10/2000 | Sawahashi et al. | |
| 6,226,317 B1 | * | 5/2001 | Bruckert et al. | 375/146 |
| 6,298,050 B1 | * | 10/2001 | van Heeswyk et al. | 370/335 |

FOREIGN PATENT DOCUMENTS

| JP | 2-855173 | 11/1998 |
|---|---|---|
| WO | 99/31919 | 6/1999 |

\* cited by examiner

*Primary Examiner*—Joseph Feild
*Assistant Examiner*—Pierre-Louis Desir
(74) *Attorney, Agent, or Firm*—Mattingly, Stanger, Malur & Brundidge, P.C.

(57) ABSTRACT

The invention intends to solve a problem that an S/I ratio of a signal from a target base station deteriorates when there is a terminal near another base station. For this purpose, a signal replica of the signal from the nearby base station is generated and the replica is subtracted from a receiving signal. A signal of the target base station is detected from the resultant receiving signal. The signal from the nearby base station is deleted from the denominator of the S/I ratio, thereby increasing the S/I ratio.

6 Claims, 6 Drawing Sheets

WIRELESS POSITIONING MEANS, WIRELESS POSITIONING APPARATUS AND MOBILE POSITION CONTROL CENTER APPARATUS

BACKGROUND OF THE INVENTION

The present invention relates to a system for measuring the position of a terminal by using cellular communications.

Japanese Patent laid-open (Kokai) No. Hei 7-181242 discloses a system using the CDMA in which each of base stations is synchronous with a GPS by a cellular method and a method for measuring the position of a terminal by observing a receiving timing of a pilot signal received from each of the base stations.

Figure 2:
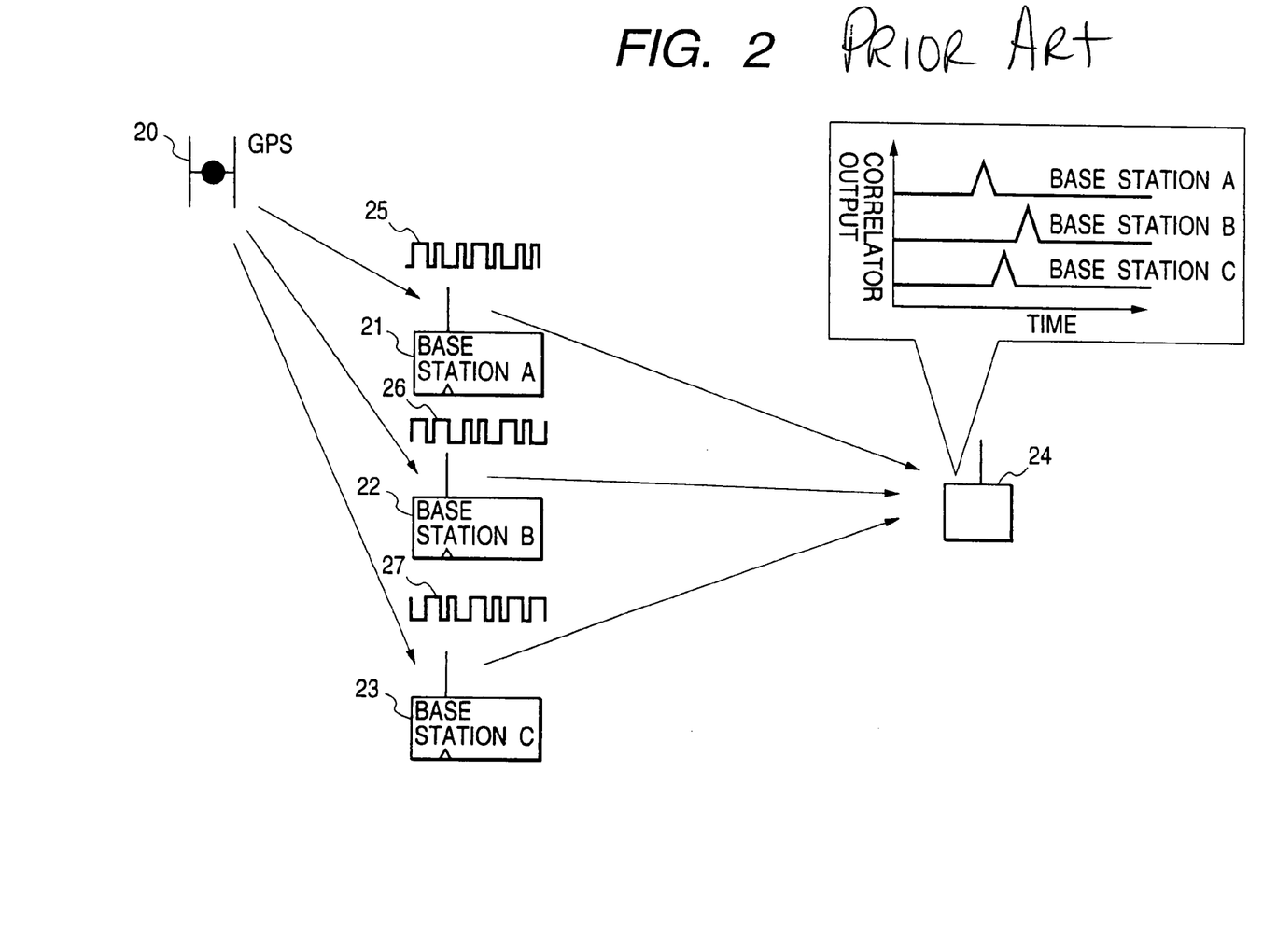
FIG. 2 is a diagram for explaining a conventional technique.
Figure 3:
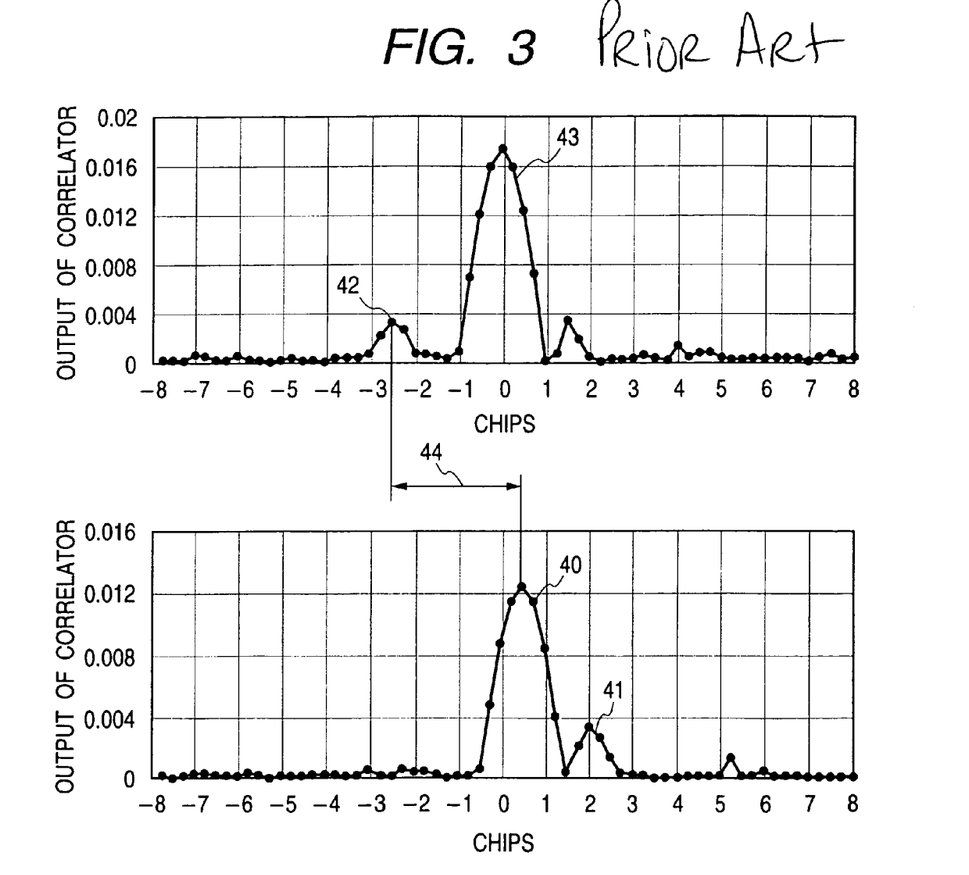
FIG. 3 shows the result of correlation performed on a signal received by the terminal.

FIGS. 2 and 3 show the technique disclosed in Japanese Patent laid-open (Kokai) No. Hei 7-181242. FIG. 2 illustrates a terminal 24 for receiving reference signals 25, 26 and 27 transmitted from base stations 21, 22 and 23 which are synchronized with a GPS satellite 20. FIG. 3 shows an example of a result of correlation calculation.

By executing a correlation calculation of a specific code pattern on a receiving signal, the terminal 24 can detect a receiving timing of a reference signal transmitted from each of the base stations. In the CDMA, a common pilot signal transmitted from each of the base stations is a signal of a specific pattern. By performing the correlation calculation on the signal, the terminal can detect a receiving timing. Each of the base stations sets reference time by being synchronized with the GPS and transmits a pilot signal at a specific transmission timing of the set system time. The specific transmission timing is called offset time, the information is transmitted via a sync channel and the terminal can freely obtain the information. By calculating a difference between the measured receiving timing and the known transmission timing, the terminal can know the delay time for wave propagation.

FIG. 3 shows an example of the correlation calculation result which is called a delay profile and shows a delay path observed. The lateral axis denotes delay time, that is, the receiving timing corrected by the transmission timing. The unit corresponds to a chip of a spreading code. The vertical axis denotes an output of a correlator. The parts 40 to 43 of large correlation values indicate receiving of a signal, that is, existence of a path. By using the result, relative delay time 44 of a radio wave transmitted from the base station to the terminal can be obtained. The reason why the delay time is expressed in a relative value is because the terminal does not know the absolute time. By multiplying the obtained relative delay time with light velocity, a relative propagation distance difference can be obtained. When the relative propagation distance difference can be obtained with respect to at least three stations, the terminal position can be estimated by hyperbolic position location solution.

Figure 4:
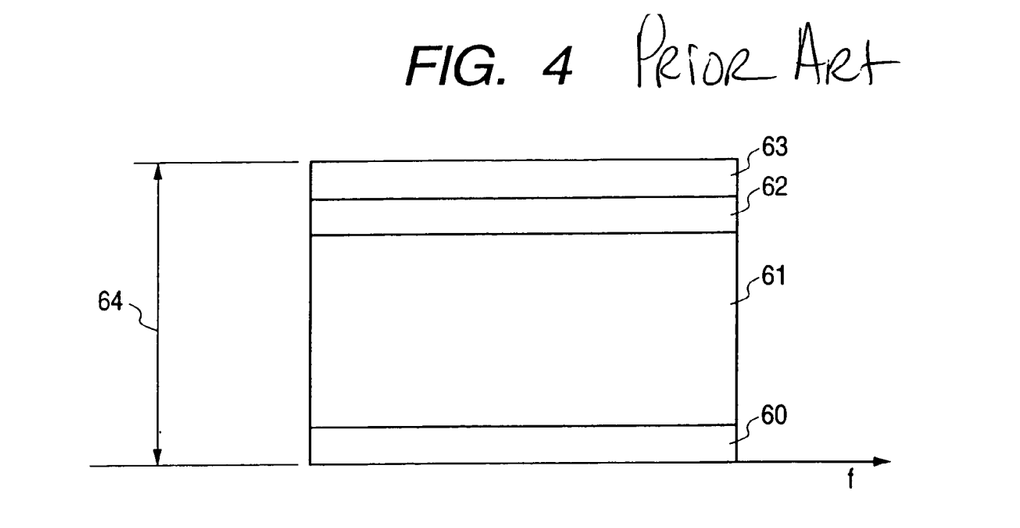
FIG. 4 shows a receiving signal spectrum in the case where there is a terminal near a specific base station.
Figure 5:
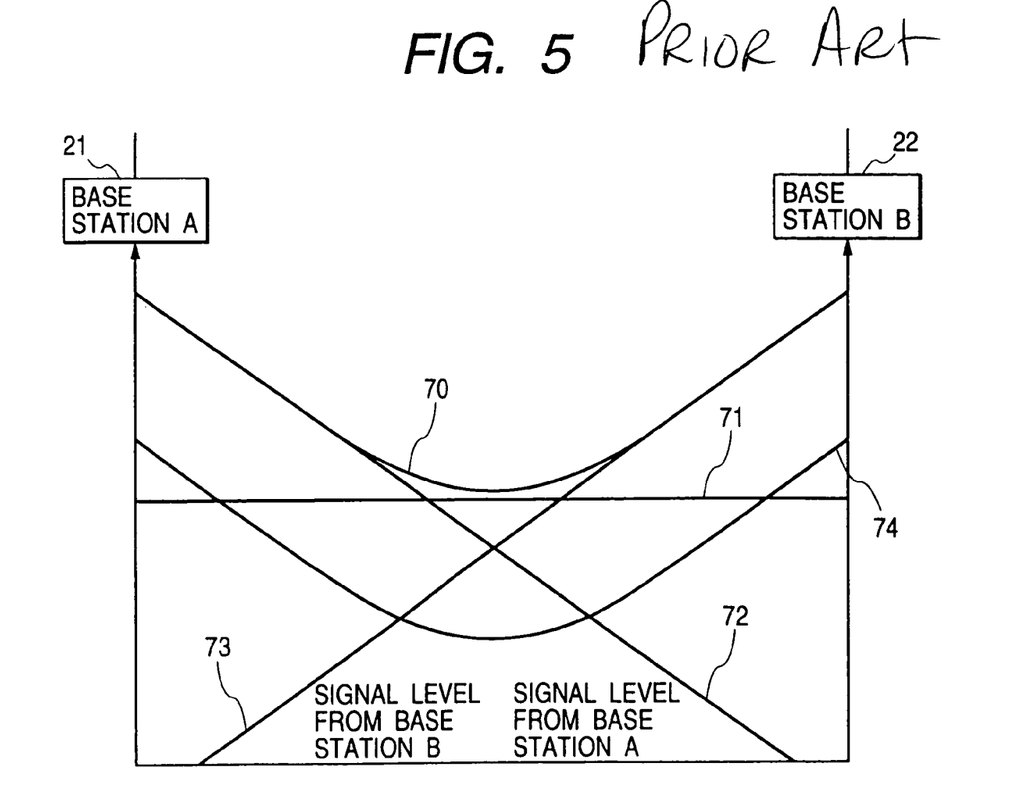
FIG. 5 is a diagram for explaining that the S/I ratio deteriorates when a terminal is near a base station in an example of two base stations.

Referring now to FIGS. 4 and 5, a near-far problem as another problem of using the cellular communication for measuring a position will be described. In the cellular communication, a receiving power varies depending on the base station-terminal position and a necessary dynamic range exceeds 100 dB. Consequently, a terminal is usually provided with an automatic gain control (AGC) function and the signal strength before A/D conversion is automatically controlled in accordance with the strength of a receiving signal. FIG. 4 shows receiving signals in frequency regions in the case where signals transmitted from three adjacent base stations are received by a terminal. A total receiving power 64 in the band is obtained by adding signals 61, 62 and 63 from the three base stations to a noise 60. The signal 61 from the nearest base station has strong power since the propagation distance is short, so that the signal is dominant in all of the receiving signals. FIG. 5 shows receiving states of two base stations A and B. A noise power 71 occurs due to thermal noise and is constant independent of the position of the terminal. The AGC is set so as to be adapted to the total receiving signal level 70. For example, when the terminal is positioned near the base station A, a signal 72 from the base station A becomes dominant and the AGC operates. Since a digitizing noise 74 fluctuates according to the AGC, its value is high when the terminal is around the base station A. Moreover, at this time, the level 74 of a signal from the base station B is lowered due to a longer propagation distance. The S/I ratio (signal-to-interference ratio)= (signal from B)/(single from A+noise) of the signal from the base station B becomes very low and it is difficult to receive signals from the base station B. In the case of performing wireless positioning, however, even if the terminal is positioned near the base terminal A, it is necessary to discriminate a signal from the base station B.

Another problem will be described. In a mobile communication terminal, a local oscillator of which frequency accuracy is not so high is used for lower price. By being synchronized with the nearest base station, the carrier frequency deviation is reduced (AFC function). There is, however, a frequency difference between the terminal and the base station beyond the limit of the AFC function. Even if there is no fading, perfect synchronization cannot be established. Consequently, the phase of a receiving signal has a slow rotary movement of a few Hz. Even when the user of the terminal is in a stationary state or in a slow movement of about walking speed, the phase of a receiving signal rotates. It is therefore difficult to perform the coherent summation for long time. Since the S/I ratio of a signal from a far base station equivalently deteriorates, it is desired to increase the number of coherent summation times. But, the number of summation times cannot be increased more than a certain degree due to the phenomenon. For example, when there is a terminal having a carrier frequency of 800 MHz and frequency stability after the AFC is 0.01 ppm, the frequency of phase rotation is 8 Hz. When the phase rotation permissible value necessary for the coherent summation is set to 36 degrees or lower, it is understood that the coherent summation can be executed for $1/8 \times 36/360 = 0.0125$ seconds or shorter. When the coherent summation is performed longer than that, the signal vector rotates and a phenomenon such that the S/I ratio deteriorates occurs.

SUMMARY OF THE INVENTION

The problems are solved by a wireless positioning method for estimating a position of a terminal by using signals transmitted from at least first and second base stations in a cellular communication system, comprising: a first step of canceling a receiving signal from the first base station of a receiving strength stronger than that of a receiving signal from the second base station; and a second step of processing the receiving signal from the second base station by the terminal after the first step.

In the case where radio waves transmitted from at least two base stations are received by a single terminal, due to a propagation distance difference and fading, a large difference occurs between the signal strengths of the radio waves. In the case of receiving a signal from a base station of weak signal strength, a signal of a base station of strong signal strength acts as an interference wave. By receiving the signal while canceling the interference wave, the influence of the interference from the base station of the strong receiving signal strength can be almost eliminated.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

Figure 1:
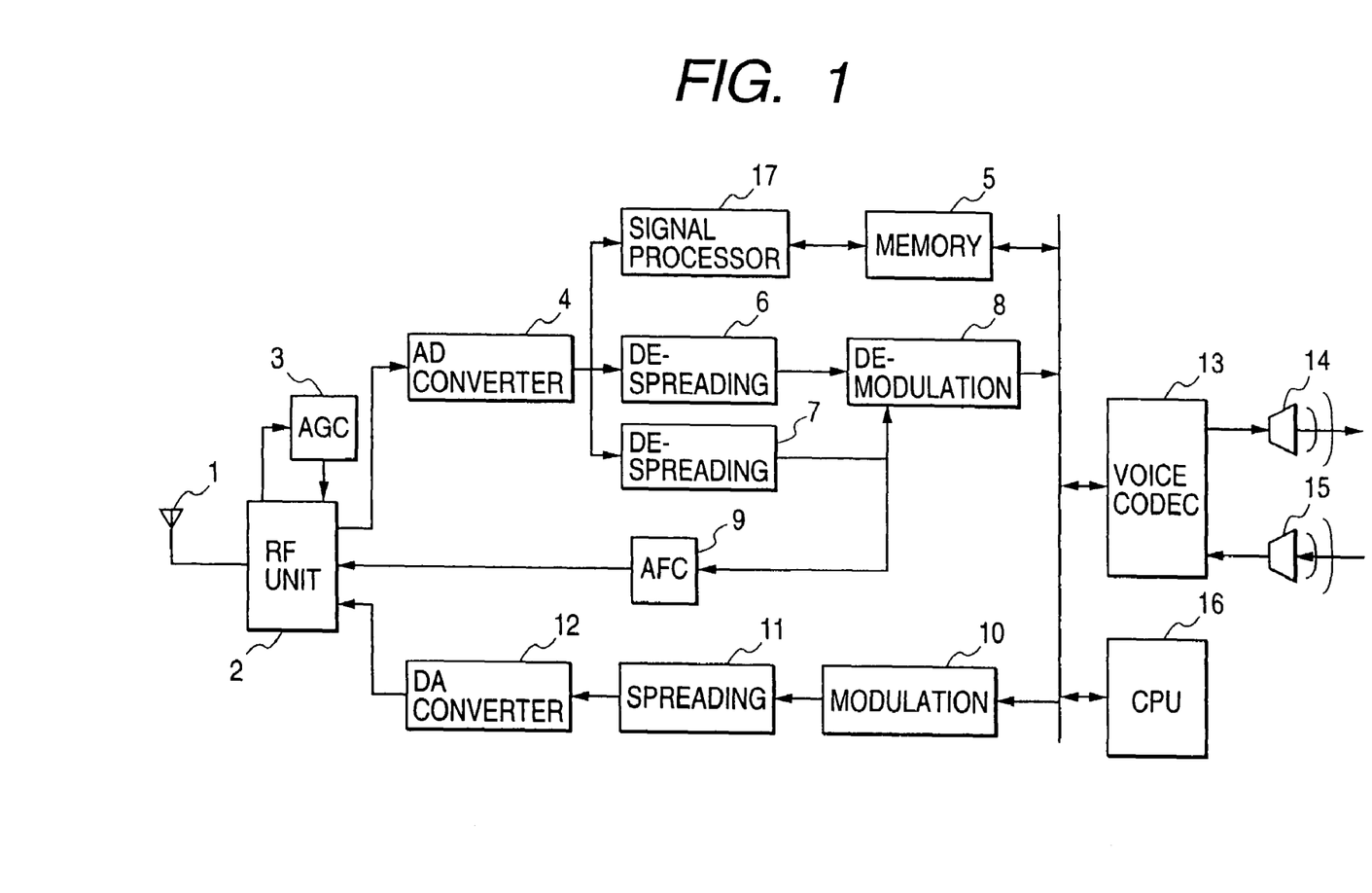
FIG. 1 shows the configuration of a terminal of a first embodiment according to the invention.

FIG. 1 shows an example of the construction of a mobile terminal.

A mobile communication terminal is provided with a receiver and a transmitter to make an ordinary communicating operation possible. The embodiment adopts the CDMA cellular. A signal received by an antenna 1 is converted to a baseband signal by an RF unit 2. The converted signal is converted to a digital signal by an AD converter 4. A pilot signal and a communication channel signal are taken from the converted signal by despreading units 6 and 7. By an output of the block 7 for despreading the pilot signal, phase rotation due to a propagation path and phase rotation due to a carrier frequency difference between the base station and the terminal are detected. On the basis of the phase rotations, the function of an AFC 9 operates. By obtaining a conjugate with respect to the propagation path estimating result as an output of despreading the pilot signal and multiplying the resultant with an output of the block 6 for despreading the communication channel, demodulation 8 is performed. In the demodulating circuit, propagation path coding is also demodulated. The demodulated signal is converted to a voice signal by a voice CODEC 13 and the voice signal is outputted from a speaker 14. On the other hand, a voice signal received by a microphone 15 is converted into a digital signal by the voice CODEC 13. The converted signal is subjected to transmission path encoding and modulation by a modulator 10. The resultant is spread by a spreading unit 11 and the spread signal is converted into an analog signal by a DA converter 12. The analog signal is up-converted to a carrier frequency by the RF unit 2 and the resultant signal is transmitted from the antenna 1.

Figure 6:
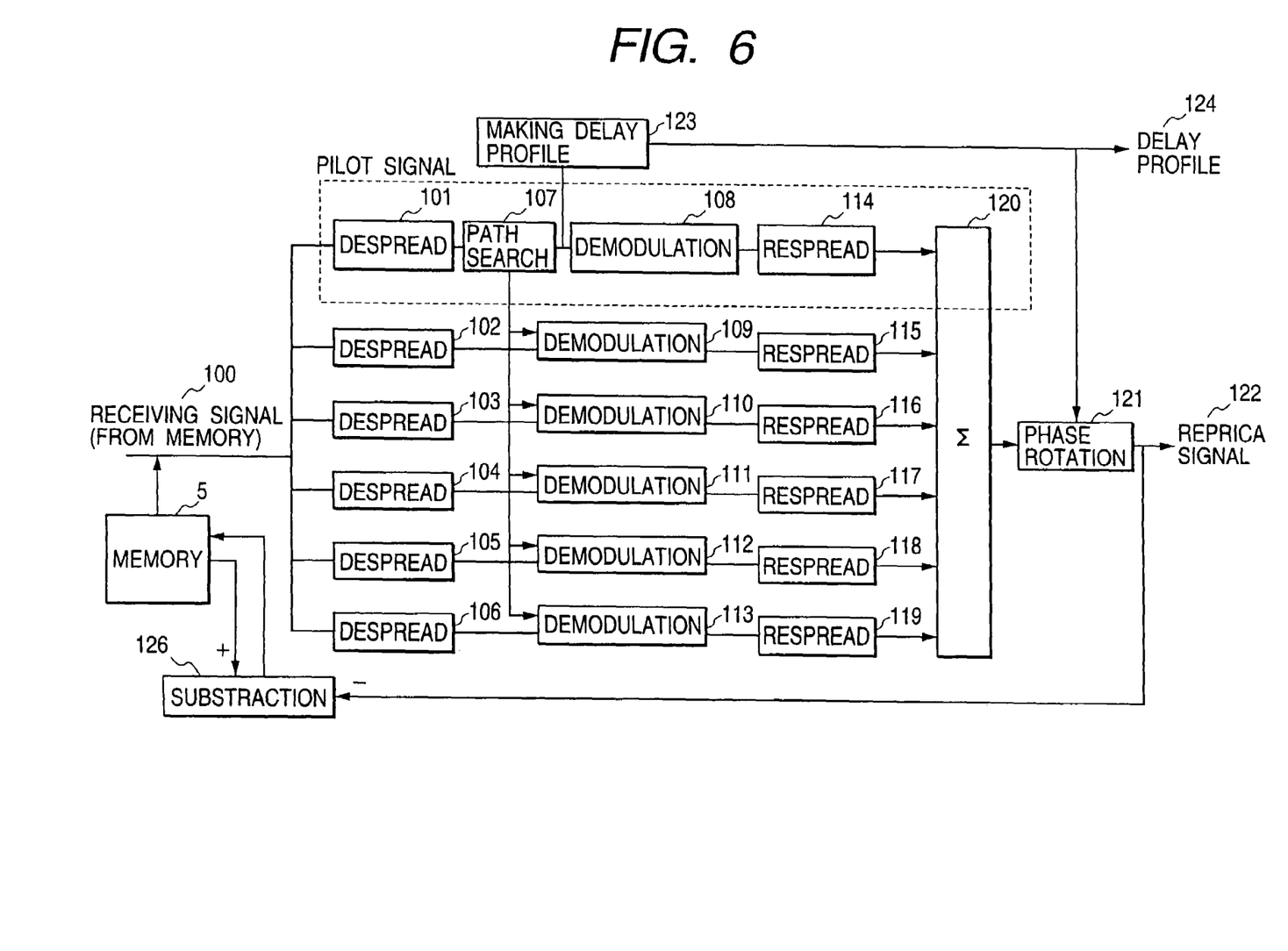
FIG. 6 is a functional block diagram for generating a replica in a third embodiment of the invention.

A first embodiment will be described with reference to FIG. 6. FIG. 6 shows the construction of an interference canceling apparatus for canceling interference.

The signal received by the terminal antenna 1 includes both a desired signal (signal desired to be reproduced) and an interference signal (other signal). In the CDMA system, the signals are included in the same frequency band at the same timing. A signal processor 17 stores a digital signal converted by the AD converter 4 as it is into a memory 5.

The interference canceling apparatus shown in FIG. 6 is built in the signal processor 17. The apparatus is realized by either hardware or software. The interference canceling apparatus reads data in the memory 5 as a receiving signal 100 and generates a replica 122 of an interference signal. The generated replica is subtracted from the data in the memory by a subtraction circuit 126 in the signal processor 17. By the operation, an influence of a nearby base station which becomes a strong interference is largely reduced. By using a delay profile calculated after increasing the S/I ratio by canceling the interference, the terminal position is estimated.

The data in the memory 5 includes three kinds of signals of a pilot signal, a paging signal and a communication signal which are spread by different spreading codes. Blocks 101 to 106 are blocks for despreading signals by respective spreading codes. A block 107 searches a propagation path from the result of despreading the pilot signal. Each of blocks 108 to 113 performs demodulation on the obtained search result. As a result of the demodulation, in the case of a BPSK communication, the transmitted code can be determined according to a positive or negative I channel code. In this case, it can be considered to improve a bit error rate of a demodulated signal by demodulating the coded propagation path as well. However, since a part of information is also scrambled for concealment of information, generally, a terminal having no de-scramble information cannot demodulate the coded propagation path. Since the S/I ratio of the signal itself is good, however, the transmitted code itself can be almost accurately searched without demodulating the coded propagation path. The obtained result of hard decision is respread by the same spreading code by blocks 114 to 119. The results are added by a block 120, thereby reproducing the signal transmitted from a specific base station. A block 123 generates a delay profile 124 from the propagation path search. The delay profile 124 is obtained by despreading a pilot signal while shifting the phase of a series of spreading codes used by the despreading. In this case, the delay profile denotes a complex amount. By multiplying the transmission signal obtained by the addition in the block 120 by the delay profile 124 obtained in the block 123 by using a phase rotation block 121, a replica signal 122 of the receiving signal is obtained. At this time, the delay profile regarding the base station which has generated the replica signal is already generated by the block 123. The block 126 denotes an interference canceling function of subtracting the replica signal 122 from a signal stored in the memory 5. The signal from which the interference wave is cancelled is again overwritten on the memory 5. With respect to signals from other base stations, similarly, by generating a delay profile while canceling the interference from the stronger one, the SI ratio is increased and the profile can be generated. After canceling all of signals of strong strength, only the delay profile is generated by using the blocks 101, 107 and 123 and a delay profile related to a base station of weak receiving power can be generated. In such a manner, when delay profiles of a plurality of base stations are generated, the CPU 16 specifies a path from each of the delay profiles and calculates a relative delay difference. The CPU 16 also calculates the position of the terminal from the calculated relative delay difference and preliminarily known positional information of the base station.

By the above process, even in the case where a near-far problem occurs, signals from a plurality of base stations can be received with a high S/I ratio and a relative distance difference to each of the base stations can be measured. The position of the terminal can be therefore detected and the problem is solved.

The above method is the method of suppressing an interference power (I) in order to improve the S/I ratio. On the other hand, there is a method of improving a signal power (S). Different from regular communications, in the case of measuring the terminal position, the immediacy is not demanded. It is therefore considered to generate a delay profile necessary for detecting a path by using all of data stored in the memory 5.

Regarding the improvement in signal power (S), the reason and measure will be described in more detail.

At the terminal, an AGC unit 3 in FIG. 1 controls a gain of the RF unit in accordance with the level of a received signal to assure a wide dynamic range. For example, the AGC 3 accumulates and averages the receiving power to obtain the receiving level and feeds back the level so that the value becomes constant, thereby controlling the gain of the RF unit. By the AGC, the AD converter can reduce the bit width.

In the case of measuring a position, at least three base stations are necessary. In order to improve an S/I ratio of a desired signal from a second baseband which is farther than a first base station, a method of increasing the number of coherent summation times is effective. The larger the number of coherent summation times is, the better the farther base station can be observed. When the number of observed base stations increases, the accuracy of estimating the terminal position is improved.

In order to perform the coherent summation, two compensating operations are necessary. One is compensation for the phase rotation of a receiving signal caused by a frequency deviation of a local oscillator between a terminal and a base station. The other one is compensation for the phase rotation caused by fading which occurs due to a change in the position of the terminal and ambient environment.

The phase rotation due to the a synchronization between the terminal and the base station is mainly caused by an insufficient frequency adjusting performance of the terminal. Since each of the base stations is synchronized with the GPS satellite, sufficient accuracy is assured between the base stations and a frequency deviation is very small. Consequently, if synchronization is established with one of the plurality of base stations, the phase rotation of the other base stations can be also synchronized. It is effective to use the phase rotation of the base station signal which has the highest signal quality, that is, the signal which becomes the maximum peak by the correlation as a reference of synchronization.

Figure 7:
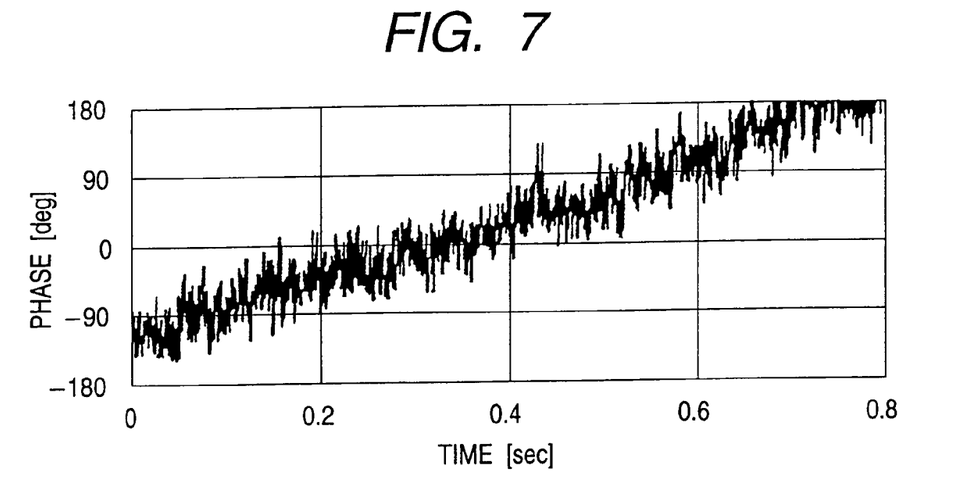
FIG. 7 shows a phase rotation amount of a result of despreading of a specific base station.

When the pilot signal of a specific base station is despread, a state as shown in FIG. 7 is obtained. Although noise components remain, by approximating the phase rotation by a linear equation, the number of average phase rotation times can be estimated. By a rotation arithmetic operation of performing inverse rotation at the estimated rotational speed, the carrier frequency difference between the terminal and the base station included in the receiving data can be almost eliminated. Since the phases of compensated data are synchronous, the coherent summation is completed only by simply adding them. In such a manner, the S/I ratio of the receiving signal can be improved.

In order to calculate the linear equation with high accuracy, it is necessary to calculate the equation by using all of data of coherent summation. Once a positioning job is started, therefore, the terminal stores receiving data for a predetermined period (the capacity of the memory of about 5 MB is necessary to collect data of one second when oversampling of four times is considered and there is information of 8 bits of I and Q signals per sample in the CDMA cellular system of a chip rate of 1.2288 MHz). The terminal already knows a receiving timing of a signal of the highest level because the terminal always searches base stations around it to perform communications and continuously traces the base station of the highest signal level. The terminal therefore performs the despreading operation on the information stored in the memory 5 to extract a pilot signal in accordance with the signal timing from the known base station of the highest signal level to estimate the propagation path. The despreading operation of a relatively low spreading ratio of about 0.1 to 10 ms is performed in this case, thereby obtaining a plurality of values. FIG. 7 shows the phases after performing the despreading for about 0.8 second by observation. As understood from the diagram, the propagation path estimation result is largely influenced by the interference power and noise power. The interference and noise components can be however eliminated by a statistical process by using the following fact. The interference and noise components are signals in a wide frequency band. On the contrary, a rotation vector of the signal component is a signal of a low frequency. Consequently, when the components of low frequencies are extracted by an averaging operation, the rotation amount can be estimated. It is understood from FIG. 7 that the frequency deviation between the base station and the terminal can be largely suppressed by estimating a linear equation of the rotation amount. After the frequency deviation between the base station and the terminal is suppressed, by performing the despreading operation around the receiving timing of a signal from each of the base stations, a delay profile of a signal from each of the base stations can be calculated.

Although the method of once storing all the measurement data into the memory has been described in the foregoing embodiment, another method shown hereinbelow is also included in the invention.

Since the result of estimation of the phase rotation is approximated by a linear expression, when the frequency deviation between the terminal and the base station does not change so much with time, the phase rotation error of the signal from the base station to the terminal can be estimated by using old values. However, since a phase difference between the base station and the terminal varies with time, a recent value has to be used. Since it is sufficient to measure only a specific base station of a good receiving quality, a memory for storing the result of despreading which is necessary for estimating the phase rotation does not require a large capacity. As the transmission timing of the nearby base station is already known from information reported from the base station, by despreading a spreading code series at around the base station timing, the delay profile can be generated. By storing despread signals in the memory, the capacity of the memory can be largely reduced. By performing coherent summation after correcting the predicted phase rotation, the despreading result can obtain an effect of the coherent summation equivalent to the above. Thus, the memory capacity can be reduced largely.

When the phase rotation is caused by fading, the phase rotations of a plurality of base stations fluctuate independently. The phase rotation is estimated with respect to the two base stations and the rotation amounts are correlated. When the correlation is, for example, more than 0.7, it shows that the phase rotation amounts of the base stations are almost the same and it is considered that no fading occurs. On the contrary, when the correlation is, for example, less than 0.7, it shows that the phase of the length cannot be corrected and only the coherent summation in shorter time can be performed. The number of coherent summation times can be therefore determined by the correlation as a threshold.

By the delay profile obtained by the above-mentioned procedure, the position of the terminal is calculated by the method described in the background.

Since the position can be measured only by the terminal and no additional device such as GPS is required in the embodiment, the consumption power necessary for the terminal to measure a position can be reduced. The terminal can know the information regarding the position of the base station by the method of obtaining the information from a server connected to a network and by transmitting the position of an ambient base station via a notification channel transmitted from the base station. By holding the base station position information once stored, the number of accesses to the server and the number of receiving times of the notification information can be reduced. Consequently, it is effective at reducing the power consumption of the terminal.

Although the CDMA system has been described as an example in the embodiment, the invention is not limited to the system. When transmitted information is known, the method can be applied to the TDMA and FDMA systems. In the case of the TDMA and FDMA systems, the transmission timings and frequencies of signals sent from the base stations are different from each other. The terminal has to therefore transfer information obtained by scanning all of timings and frequencies included in the signals to the mobile position control center apparatus.

In the foregoing embodiment, the method of measuring the transmission timing of the terminal for measuring a position and estimating the terminal position has been described. On the other hand, the invention can be applied not only to the terminal for measuring a position but also the apparatus for measurement of tx (transmission) timings of base stations. The apparatus for measurement of tx timings of base stations is used to measure the transmission timings of base stations and correct a transmission timing error among the base stations included in the case of measuring a position. The measurement apparatus is connected to a cellular circuit or a network. By inquiring the measurement apparatus of an error of the transmission timing via the cellular circuit and network, the terminal for measuring a position can measure the accurate position of the terminal. Since the installable place of the measurement apparatus is, however, limited due to the installing cost, it is desired to measure a base station as far as possible by one apparatus. In such a case, in a manner similar to the case of the terminal, a near-far problem occurs. It is therefore necessary to devise to cancel the interference and to increase the number of coherent summation times. When the invention is applied to the apparatus for measurement of tx timings of base stations, the near-far problem can be avoided and the transmission timing of a signal from a far base station can be also measured.

According to the invention, when the position of the terminal is measured by using the cellular communication system, various processes necessary to raise the estimation accuracy can be performed by storing received information in the memory.

It is further understood by those skilled in the art that the foregoing description is a preferred embodiment of the disclosed device and that various changes and modifications may be made in the invention without departing from the spirit and scope thereof.

What is claimed is:

1. A wireless positioning method for estimating a position of a terminal by using reception timings of signals transmitted from at least first and second base stations in a cellular communication system, comprising:
   a first step of storing received signals from a plurality of base stations in a storing circuit;
   a second step of reading out received signals stored in the storing circuit and measuring a reception timing of a received signal from the first base station having a power higher than that of a received signal from a second base station;
   a third step of canceling the received signal from the first base station from stored received signals;
   a fourth step of reading out received signals stored in the storing circuit and measuring a reception timing of the received signal from the second base station after the second step, wherein the third step comprises:
   a fifth step of forming a replica of the received signal of the first base station from the stored signals;
   a sixth step of subtracting the replica from the stored signals and overwriting the signals stored in the storing circuit with a result of the subtraction step; and
   a seventh step of forming the replica by processing a component of the received signal from the first base station in a procedure of despreading, demodulation and respreading by using the code division multiple access (CDMA) system.

2. A wireless positioning method according to claim 1, wherein the seventh step includes an eighth step of amplifying a received signal after the despreading, demodulation and respreading.

3. A wireless positioning method according to claim 2, wherein the eighth step includes a ninth step of correcting at least one of amplitude fluctuation and phase rotation by a signal propagation path from the first base station.

4. A wireless positioning apparatus comprising:
   a signal processor for canceling a received signal from a first base station whose reception power is higher than that of a received signal from a second base station in a cellular communication system;
   a CPU for processing an output signal of the signal processor;
   a storing circuit for storing the received signals from the first and second base stations, and
   a timing measurement circuit for measuring reception timings of the signals received from the first and second base stations based on signals stored in the storing circuit,
   wherein the signal processor has:
   a replica signal generating circuit for generating a replica of the received signal of the first base station from the signals stored in the storing circuit; and
   a subtraction circuit for subtracting the replica from the stored signals,
   wherein the stored signals are overwritten with a result of the subtraction and the timing measurement circuit measures the reception timing of the signal received from the second base station based on the overwritten signals in the storing circuit, and
   wherein the replica signal generating circuit has:
   a despreading circuit for despreading a component of a received signal from the first base station by using a code division multiple access system (CDMA);
   a demodulating circuit for demodulating an output signal of the despreading circuit; and
   a respreading circuit for respreading an output signal of the demodulating circuit.

5. A wireless positioning apparatus according to claim 4, further comprising an amplifying circuit for amplifying an output signal of the respreading circuit.

6. A wireless positioning apparatus according to claim 5, further comprising a correcting circuit for correcting at least one of amplitude fluctuation and phase rotation by a signal propagation path from the first base station.

* * * * *